United States Patent [19]

Hilton

[11] 3,910,584

[45] Oct. 7, 1975

[54] REMOTE CONTROL APPARATUS FOR PHONOGRAPHS

[76] Inventor: James C. Hilton, 1033-E Shary Circle, Concord, Calif. 94518

[22] Filed: Oct. 23, 1973

[21] Appl. No.: 408,499

[52] U.S. Cl. .......................................... 274/14
[51] Int. Cl.$^2$ .......................................... G11B 17/06
[58] Field of Search .......................................... 274/14, 21

[56] References Cited

UNITED STATES PATENTS

| | | | |
|---|---|---|---|
| 1,983,039 | 12/1934 | Lucarelle et al. | 274/21 |
| 2,066,859 | 1/1937 | Schiler | 274/14 |
| 2,240,321 | 4/1941 | Thompson et al. | 274/21 |
| 3,046,023 | 7/1962 | Wells | 274/14 |
| 3,169,774 | 2/1965 | Duellenbach | 274/14 |
| 3,500,551 | 3/1970 | Polewski | 274/14 |
| 3,797,834 | 3/1974 | Takahashi et al. | 274/105 |

OTHER PUBLICATIONS

IBM Technical Disclosure Bulletin, Vol. 6, No. 1, June 1963, "Backspacing Mechanism," W. L. Dollenmayer.

*Primary Examiner*—Richard E. Aegerter
*Assistant Examiner*—John W. Shepperd
*Attorney, Agent, or Firm*—Rankin A. Milliken

[57] ABSTRACT

Remote control apparatus for lifting the tone arm of a phonograph from a record being played and immediately repositioning the tone arm to recommence the playing of the same record is disclosed. The disclosed apparatus includes a tone arm repositioning ramp which is tiltable about a horizontal pivot affixed to the deck of the phonograph from a rest position to a fully raised position. The disclosed apparatus also includes a power drive for tilting the tone arm repositioning ramp into its fully raised position and then returning the tone arm repositioning ramp to its rest position under the control of a manually operable switch located remotely from the phonograph. The tone arm repositioning ramp is so located with respect to the tone arm that whenever a record is being played on the phonograph and the ramp is driven from its rest position to its fully raised position the ramp lifts the tone arm from the record. After being thus lifted from the record, the tone arm slides down the ramp until it bears against a stop affixed to the ramp. The position of the stop is such that when the ramp returns to its rest position from its fully raised position the tone arm is deposited on the record with its stylus in the exposed record groove just before or at the beginning of the musically modulated position of the record groove. The disclosed apparatus also includes an arresting device which halts the tone arm repositioning ramp in its fully raised position, and thus maintains the tone arm withdrawn from the record, so long as the manually operated switch is depressed.

1 Claim, 8 Drawing Figures

(REST)

(START)

(IMMEDIATE REPLAY)

(DELAYED REPLAY)

REMOTE CONTROL APPARATUS FOR PHONOGRAPHS

BACKGROUND OF THE INVENTION

1. Field of the Invention

The present invention relates to remote control apparatus for phonographs, and more particularly to remote control apparatus whereby the tone arm of a phonograph which is playing a record may be lifted from the record being played and very quickly (e.g., in about two seconds) deposited on the revolving record just before or at the beginning of the musically modulated portion of the exposed record groove, thereby substantially immediately recommencing the playing of the record.

2. Description of the Prior Art

The prior art includes remote control apparatus for phonographs, such as those commonly found in restaurants and the like, whereby diners may determine at their tables the selections to be played by a central phonograph of the type sometimes called a "juke box". In such prior art remote control apparatus for phonographs the manually operable control units are generally secured in fixed locations. Also, such prior art remote control apparatus are generally so arranged that once the playing of a record has been commenced under remote control the entire record will be played, and the playing stylus withdrawn to a rest position farther from the record axis than the radius of the record, before the same record can be replayed under remote control.

SUMMARY OF THE INVENTION

Such prior art remote control apparatus for phonographs, however, are unsuited to the needs of certain phonograph users such as square dance callers.

I have found that these phonograph users require a phonograph incorporating remote control apparatus by which the playing of a record may be interrupted at any desired point of the groove being played and the playing of the same record immediately recommenced.

I have further found that the manually operable control unit or transmitter of such apparatus should be very light and portable, so that the user may freely move about at some distance from the phonograph. I have yet further discovered that it is preferable in some cases that the manually operable control unit or transmitter of such apparatus consist chiefly of a simple pushbutton switch incorporated in the handle of a microphone, such as that commonly carried, e.g., by a square dance caller, and forming part of the public address system by which the caller's calls and the music from an associated phonograph are amplified. I have yet further discovered that arresting means are desirably provided whereby, after the playing of a record has been interrupted by means of my novel remote control apparatus, the recommencement of the playing of that record can be delayed so long as it is desired by the caller or other user. I have also found it to be desirable that the operation of said arresting means, and the consequent delay of the recommencement of the playing of the record, be brought about by maintaining said pushbutton in its depressed state, the recommencement of the playing of the record taking place only when the pushbutton is released.

Accordingly, it is an object of my invention to provide novel remote control apparatus for phonographs by means of which the playing of a record may be interrupted and immediately recommenced.

It is yet another object of my invention to provide in such a novel remote control apparatus for phonographs means whereby the recommencement of the playing of the record may be delayed from so long a time as is desired by the user, and then immediately take place.

In accordance with one aspect of my invention such novel remote control apparatus comprises ramp means underlying the tone arm of the phonograph, stop means affixed to the ramp means, tilting means for tilting the ramp means from its substantially horizontal position of rest sufficiently to lift the tone arm and withdraw its stylus from the groove of the record being played, and to cause the tone arm to slide down the ramp and engage the stop, the stop being so located that when the ramp is returned to its rest position by the tilting means the stylus is deposited in the record groove being played at a position before or at the beginning of the musically modulated portion of the groove, and remotely controlled motive means for operating the tilting means.

In accordance with another aspect of my invention the manually operable control unit or transmitter of the remote control apparatus for controlling said motive means comprises a pushbutton switch incorporated in the handle of a microphone.

In accordance with yet another aspect of my invention arresting means is provided for arresting the operation of said motive means when the stylus of the phonograph is withdrawn from the record.

In accordance with a further aspect of my invention said arresting means is brought into operation by maintaining said pushbutton switch in its depressed state after the stylus has been withdrawn from the record.

Other objects and aspects of my invention will in part be obvious and will in part appear hereinafter.

My invention accordingly comprises the features of construction, combinations of elements, and arrangements of parts which will be exemplified in the construction hereinafter set forth, and the scope of the invention will be indicated in the appended claims.

For a fuller understanding of the nature and objects of my invention reference should be had to the following detailed description, taken in connection with the accompanying drawings.

DETAILED DESCRIPTION OF THE INVENTION

Figure 1:
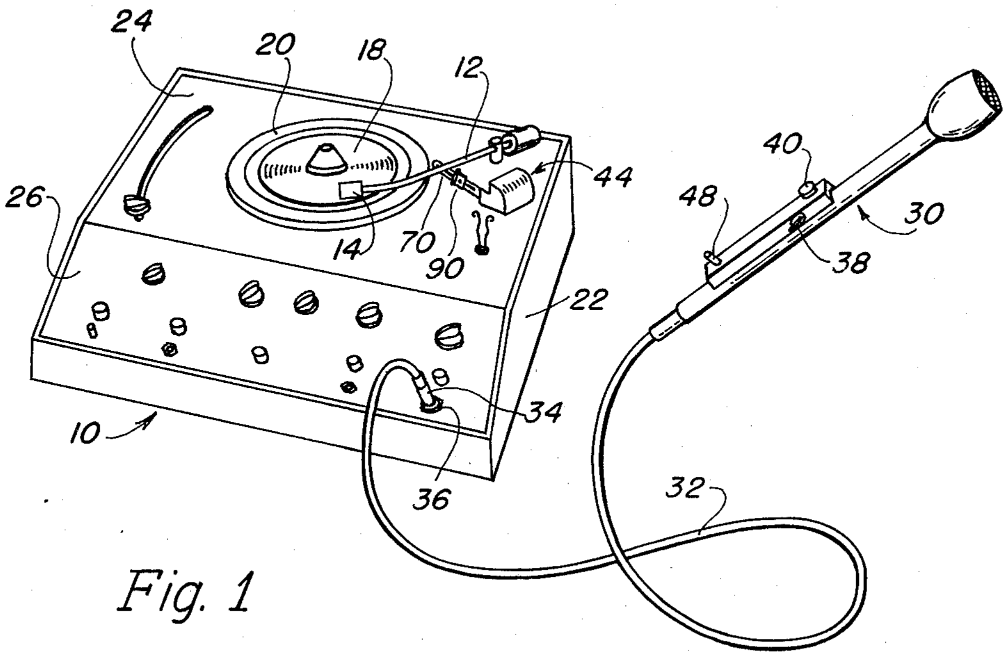
FIG. 1 is a perspective view illustrating a phonograph of the type used by square dance callers, equipped with remote control apparatus embodying my invention.

Referring now to the drawings, there is shown in FIG. 1 a phonograph of the type used, e.g., by square dance callers, which is equipped with remote control apparatus embodying my invention.

The phonograph 10 of FIG. 1 comprises, in the well-known manner, a tone arm 12 carrying a head 14. Also in the well-known manner, head 14 contains a phonograph cartridge 15 (not shown) from which projects a stylus 16 (also not shown). When phonograph 10 is playing a record 18, the record is disposed on the record receiving surface of turntable 20, as shown, and rotated thereby, the stylus 16 tracing the musically modulated portion of the exposed groove of record 18, all in the well-known manner. Phonograph 10 further comprises a housing 22, having a flat top surface or deck 24, and contains amplifying means (not shown) for amplifying the electrical signal provided by cartridge 15, said amplifying means being controlled by manually operable controls disposed on a control panel 26 all in the well-known manner.

As is well-known in phonographs adapted for use by square dance callers, housing 22 contains additional amplifying means (not shown) for amplifying electrical voice signals provided by a microphone 30, microphone 30 being connected to said additional amplifying means by way of a flexible cable 32 and mating plug 34 and jack 36 on control panel 26. Manual controls for controlling the operation of said additional amplifying means are disposed on control panel 26, in the well-known manner. Mixing means are also provided whereby the outputs of said two amplifying means are mixed, and means are provided whereby the output signal from said mixing means is impressed upon one or more loudspeakers (not shown). Microphone 30 is preferably provided with a manually operable switch 39 by means of which the circuit conveying the voice signal from microphone 30 to said additional amplifying means may be interrupted as desired, and further provided with a volume control operated by a knob 40 by means of which the level of the signal produced by said mixer may be regulated.

As is well-known to those having acquaintance with square dancing, the caller, employing a phonograph of the general type shown and described in connection with FIG. 1, will often station himself, or move about, at varying distances from the phonograph 10, limited only by the length of flexible cable 32.

I have discovered that on many occasions when instructing novice square dancers, or introducing experienced square dancers to new evolution, or routines, it is desired by experienced square dance callers to be able to interrupt the playing of a record by the phonograph, e.g., phonograph 10, and immediately recommence the playing of that same record, without going to the phonograph 10 and manuevering the tone arm 12 manually.

I have further discovered that square dance callers desire to not only be able to interrupt the playing of a record and immediately recommence the playing of the same record, as just described, but also desire to be able to delay the recommencement of the playing of the same record at will, for the purpose, e.g., of delivering comments to novice square dancers being instructed regarding their performance during the previous playing of part of the record. These desiderata are accomplished by the remote control apparatus of my invention, which will now be described.

The main parts of my invention, as illustrated in FIG. 1, are the tone arm repositioning assembly 44 and the manually operated remote control switch 48, located on the handle of microphone 30.

Figure 2:
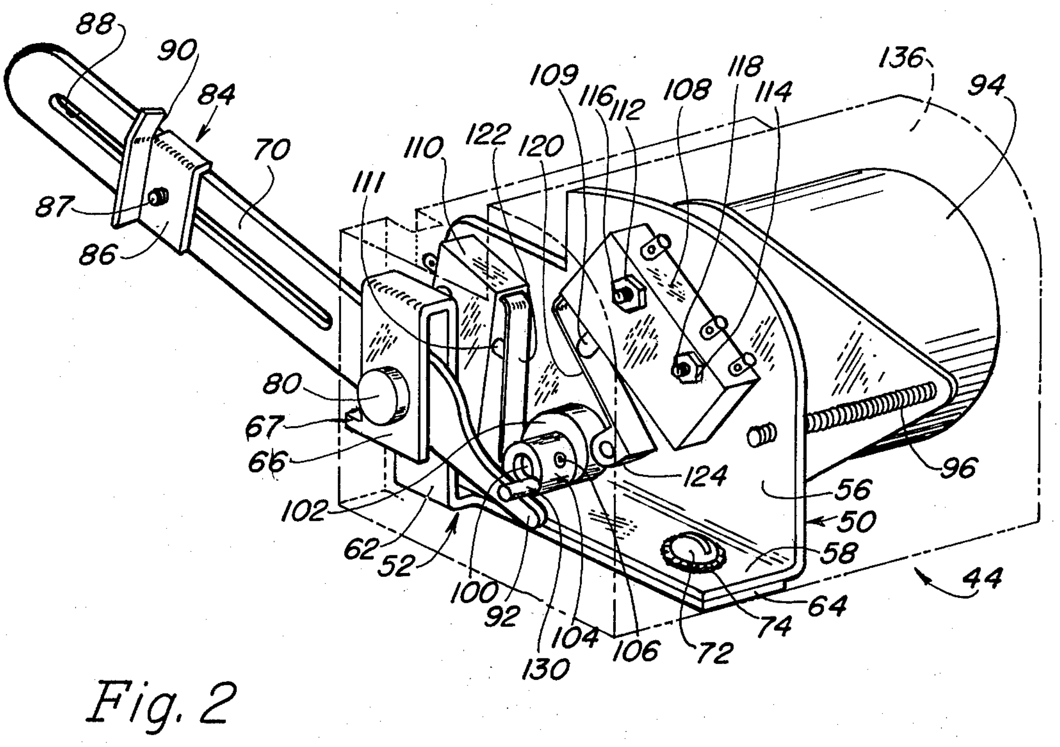
FIG. 2 is a perspective view, partly in phantom, illustrating the tone arm repositioning assembly of the remote control apparatus of FIG. 1.

Referring now to FIG. 2, there are shown the principal parts of the tone arm repositioning assembly 44. These parts are maintained in operative juxtaposition by means of brackets 50 and 52, which may, for instance, be stamped from sheet metal. Bracket 50 generally comprises an upstanding body portion 56 and a horizontal flange 58. Bracket 52 generally comprises an upstanding arm 62 and a horizontal flange 64. The upper end portion 66 of upstanding arm 62 is folded back upon upstanding arm 62, the spacing between the adjacent faces of arm 62 and end portion 66 being such as to slidably, close-fittingly receive tone arm repositioning ramp 70, which will hereinafter be described. An inwardly turned ear 67 of end portion 66 provides a stop for maintaining ramp 70 in its rest position. Both of the flanges 58 and 64 are provided with a pair of holes (not shown), and these holes are so located in their respective flanges as to be in registration when the brackets 50 and 52 are correctly juxtaposed, as shown in FIG. 2.

Tone arm repositioning assembly 44 is affixed to the deck 24 of phonograph 10, in the position illustrated in FIG. 1, by means, e.g., of a pair of self-tapping screws 72 (only one shown, FIG. 2) which may be provided with a lock washer 74, or the like, by those having ordinary skill in the art.

As may be seen in FIG. 1, tone arm repositioning assembly 44 is mounted on deck 24 in such a position that tone arm repositioning ramp 70 extends generally perpendicularly to tone arm 12 when the head 14 or tone arm 12 is located midway of the exposed groove of record 18.

The embodiment of my invention shown and described herein is adapted for use in connection with 45 RPM records only, since the great bulk of all musical selections employed by square dance callers is readily available on such records, which are compact, and easy to transport. It is to be noted in this connection that although the device of the present embodiment of my invention is adapted to be used only in connection with 45 RPM records it is so constructed and arranged as not to interfere with the playing of records of other sizes than the standard 45 RPM size on phonographs to which it is applied. The manner of adaptation of the device of my invention to use with records of sizes other than standard 45 RPM size, if desired, will be evident to those having ordinary skill in the art without the exercise of invention.

Going to FIG. 1, it will be seen that the length of tone arm repositioning ramp 70 must be such that when tone arm repositioning ramp 70 is correctly mounted on the deck 24 of phonograph 10 it underlies tone arm 12 throughout the playing of 45 RPM record 18.

Returning now to FIG. 2, it may be seen that tone arm repositioning ramp 70 is pivotably mounted upon a horizontal pivot 80. Horizontal pivot 80 may, for instance, be a threaded member having a knurled head and a smaller shank adapted to be received in aligned holes provided in arm 62 and its overturned end portion 66; at least one of these aligned holes being internally threaded to interfit with the threads of the shank of pivot 80, thus to maintain pivot 80 in said aligned holes.

As best seen in FIG. 2, an adjustable stop assembly 84 is mounted upon tone arm repositioning ramp 70. Adjustable stop assembly 84 comprises a main body 86 which is adapted, when permitted, to slide along ramp 70. Main body 86 is provided with a tapped hole which receives a screw 87 having a knurled head (not shown). Ramp 70 is provided with a clearance slot 88, the width of which is greater than the diameter of the threaded shank portion of screw 87, but not as great as the diameter of the knurled head of screw 87. In assembling stop 84 onto ramp 70, body portion 86 is first mounted on ramp 70, and then the threaded shank portion of screw 87 is passed through clearance slot 88 and threaded into the tapped hole in main body portion 86. Thus, it can be seen that stop assembly 84 may be secured at any desired point of ramp 70 by tightening, by means of the knurled head, screw 87 against the side of ramp 70 opposite main body 86.

As may also be seen in FIG. 2, a finger 90 projects upwardly from main body 86 of stop assembly 84. As hereinafter described, in connection with FIG. 4, it is finger 90 (sometimes called "stop 90") which serves to stop tone arm 12 as it slides down ramp 70, when ramp 70 is raised under remote control in the manner described below.

As may be further seen in FIG. 2, the end of ramp 70 opposite the end containing slot 88 is reduced to a narrow finger 92, by means of which ramp 70 is driven from its rest position to its fully raised position, as hereinafter described.

As may also be seen in FIG. 2, a motor 94, which may, for instance, be a 60 RPM step-by-step motor of the kind manufactured by the Haydon Instrument Company, and identified commercially as a "Big Inch" AC precision timing motor, 115 VAC, Series 33000, Model 33005, is mounted on upstanding body portion 56 of bracket 50 by means of screws (only one shown) received in suitable tapped holes through upstanding body portion 56. A clearance hole (not shown) through upstanding body portion 56 is provided to accommodate the shaft 100 of motor 94. A cam 102 and a collar 104 are both mounted on shaft 100 and irrotatably affixed thereto (i.e., affixed thereto for conjoint rotation therewith, and so as to be incapable of rotating with respect thereto, as for instance, by a set screw 106.

A pair 108, 110 of precision snap-action switches (e.g., No. 111-SM2-7244 Micro-Switches) are also mounted on upstanding body portion 56 of bracket 50, as by means of suitable nuts 112, 114 and bolts 116, 118, passing through suitable holes in body portion 56, the nuts and bolts for mounting precision switch 110 being concealed in FIG. 2. Switches 108 and 110 are actuated by plungers 109 and 111, respectively, in the well known manner.

As also seen in FIG. 2, precision snap-action switches 108 and 110 are provided with actuator arms 120 and 122 of the well known type supplied by switch manufacturers, each actuator arm being provided with a follower wheel 124, 125 (only one, i.e., 124, shown) which follows the contour of cam 102 to cyclically operate its associated switch in the manner hereinafter described.

As may also be seen in FIG. 2, a drive pin 130 projects from the end of collar 104 and coacts with the upper surface of finger 92 of ramp 70. Pin 130 may, for instance, be brazed into a bore in collar 104 which runs parallel to the axis of collar 104, whereby pin 130 is maintained parallel to the axis of shaft 100 as it revolves about the axis of shaft 100 when shaft 100 if rotated by motor 94. It will be evident to those having ordinary skill in the art from inspection of FIG. 2 that by means of drive pin 130 ramp 70 is caused to execute a complete operating stroke, from rest (FIG. 3) to fully raised position (FIG. 4) and back to its rest position, during each complete rotation of shaft 100, starting with pin 130 remote from finger 92.

In addition to the parts of tone arm repositioning assembly 44 shown in FIG. 2, there is also a relay 132 (e.g., Sigma 5-59F1D SPDT Relay) mounted on the back of body portion 56 (as seen in FIG. 2), and behind motor 94. For clarity of illustration, the wires interconnecting the electrical parts of tone arm repositioning assembly 44 are not shown in FIG. 2. These electrical interconnections are shown and described in detail in connection with FIGS. 5 through 8 hereinbelow.

A cover 136 (FIG. 2) is preferably provided in order to protect the parts of the tone arm repositioning assembly 44. Means for securing such a cover in operative position will be provided by those having ordinary skill in the art without the exercise of invention, and thus are not shown or described herein.

Figure 3:
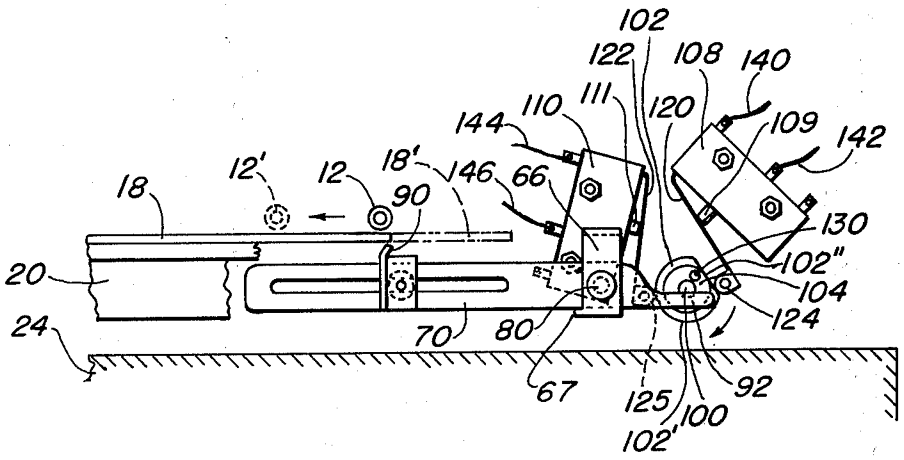
FIG. 3 is a fragmentary vertical view of the tone arm repositioning assembly of FIG. 2, showing the tone arm repositioning ramp in its rest position.

Referring now to FIG. 3 there is shown the relative positions of the principal parts of tone arm repositioning assembly 44, and certain parts of phonograph 10, when tone are repositioning ramp 70 is in its rest position.

As best seen in FIG. 3, the contour of cam 102 comprises two main portions, i.e., the full rise circular portion 102' and the flat portion 102'', the approximate angular extend of these portions being illustrated in FIG. 3.

It will also be seen in FIG. 3 that when ramp 70 is in its rest position drive pin 130 is disengaged from finger 92, and that ramp 70 is maintained in an approximately horizontal position by bearing upon the top surface of inwardly turned ear 67 of the overturned portion 66 of arm 62. In this approximately horizontal position ramp 70 lies entirely below any record on turntable 20, and thus does not interfere with the playing of large diameter 33⅓ RPM records (indicated by dashed lines 18'), even though turntable 20 be of smaller diameter than the diameter of standard 33⅓ RPM records.

Going again to FIG. 3, it will be seen that stop 90 also lies entirely below any record disposed on turntable 20, and thus, like ramp 70, does not interfere with the playing of records of the largest standard diameter when they are disposed on turntable 20.

Stop 90 is positioned by the user of the phonograph equipped with my invention and fixed by means of screw 87, at such position on ramp 70 that whenever the remote control apparatus of my invention is operated through a full cycle stylus 16 is deposited in the exposed record groove at or just before the beginning of the modulated portion thereof.

Returning now to FIG. 3, it will further be seen that cam 102 is so oriented about its axis when ramp 70 is at rest as to cause actuator arm 122 to depress plunger 111 of precision switch 110, and at the same time, to cause actuator arm 120 to release plunger 109 of precision switch 110.

As further indicated in FIG. 3, the tone arm repositioning assembly circuit wires 140, 142, 144, 146 are connected to the "common" and "normally open" terminals of precision switches 108, 110. Thus, it will be apparent from FIG. 3 to those having ordinary skill in the art and acquainted with the circuit and terminal conventions generally observed with reference to precision snap-action switches that switches 108 and 110 are open when and only when their associated follower wheels 124, 125 are in contact with the central portion of flat 102″ of cam 102. That is, switch 108 is open only when its associated follower wheel 124 is in contact with the central portion of flat 102″, and switch 110 is open only when its associated follower wheel 125 is in contact with the central portion of flat 102″.

Summarizing, it may be seen from FIG. 3 that when ramp 70 is in its rest position switch 108 is open, and switch 110 is closed.

Figure 4:
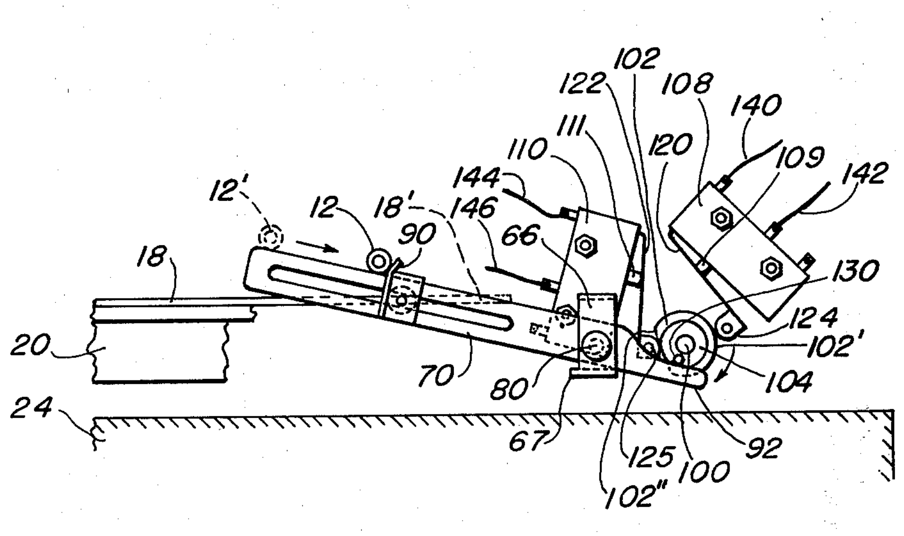
FIG. 4 is a fragmentary vertical view of the tone arm repositioning assembly of FIG. 2, showing the tone arm repositioning ramp in its fully raised position.

Referring now to FIG. 4, and comparing it with FIG. 3, it will be seen that when ramp 70 is driven from its rest position to its fully raised position (FIG. 4), by the action of pin 130 on the upper surface of finger 92, tone arm 12 is lifted to approximately its 12′ (dashed) position in FIG. 4, and then slides down ramp 70 to its 12 (solid line) position in FIG. 4. It will also be seen by comparison of FIGS. 3 and 4 that when ramp 70 returns from its fully raised position to its rest position (FIG. 3) tone arm 12 initially occupies its solid line position in FIG. 3. When tone arm 12 is in this position stylus 16 is located in the outer unmodulated portion of the exposed record grooves and near its inner end. Stylus 16 then follows the groove of record 18 (which is turning with turntable 20), playing record 18, until, by way of example, it reaches the dashed line position 12′ shown in FIG. 3. If at that time the user actuates switch 48 (FIG. 1) shaft 100 will be turned by motor 94, ramp 70 will be driven by pin 130 to its position shown in FIG. 4, and tone arm 12 to its solid line position shown in FIG. 4.

It will also be seen by inspection of FIG. 4, in view of the precision switch conventions discussed above, that when ramp 70 is in its fully raised position switch 110 is open, and switch 108 is closed.

OPERATION

The operation of the remote control apparatus of the present embodiment of my invention will now be described in connection with the schematic circuit state diagrams of FIGS. 5 through 8.

In FIGS. 5 through 8 it will be seen that the circuit of the present embodiment of my invention comprises manual switch 48 (FIG. 1), relay 132, cam 102, motor 94, and cam switches 108 and 110. The circuit of the present embodiment further comprises a power supply 160 for supplying 6 volt direct current to energize relay 132 via manual switch 48, the provision of such a power supply being within the scope of those having ordinary skill in the art, and a source of alternating current power for exciting motor 94, e.g., an isolation transformer fed from the power line by which the turntable drive motor of phonograph 10 is powered.

Figure 5:
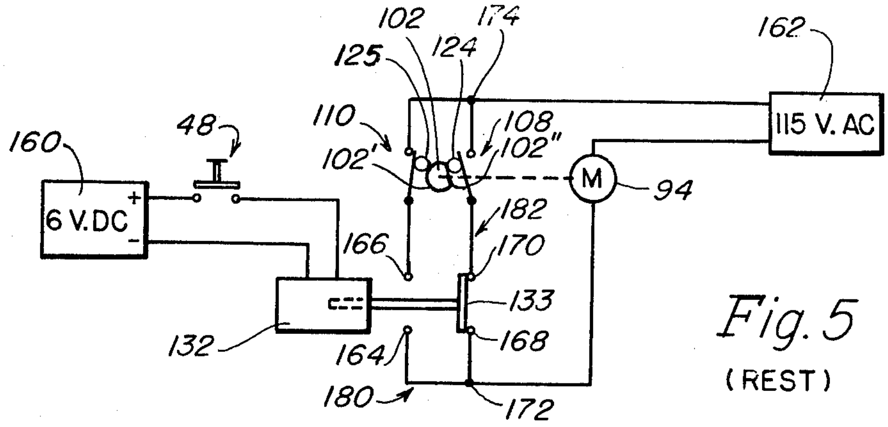
FIGS. 5 through 8 are electrical schematic diagrams illustrating the disposition of the principal electrical parts of the embodiment of my invention shown and described herein at certain phases of the operation thereof.
Figure 6:
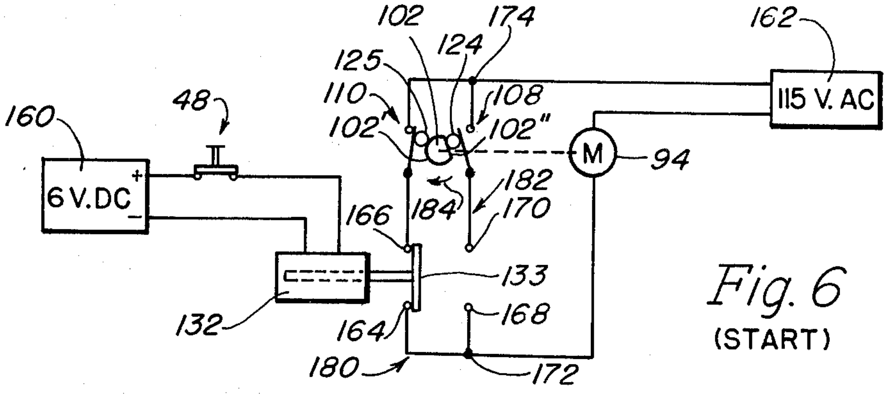
Figure 7:
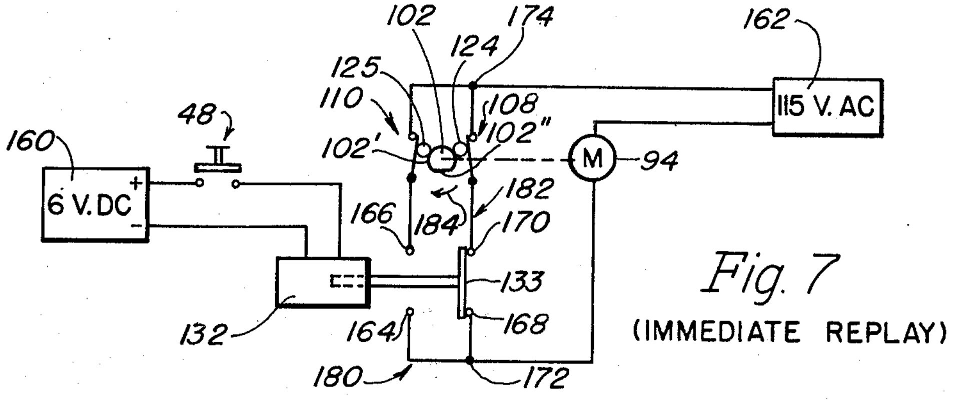
Figure 8:
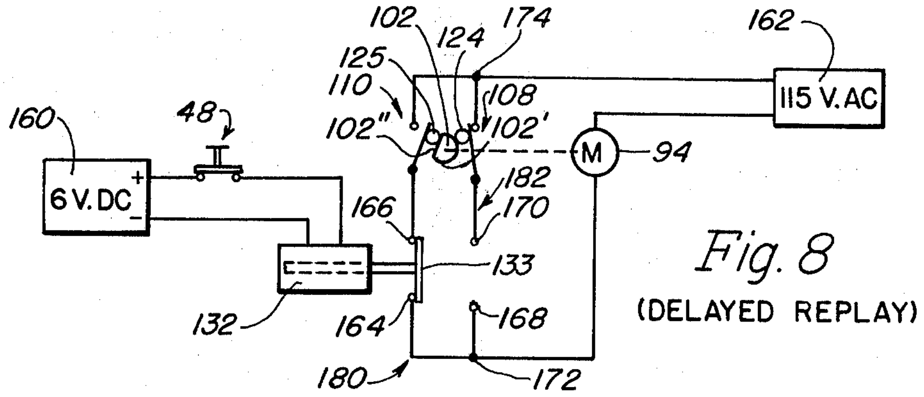

Before considering the operation of the device of the present embodiment, it should be noted that in FIGS. 6 and 8 manual pushbutton switch 48 is shown as closed, and thus relay 132 is energized. In FIGS. 5 and 7, on the other hand, switch 48 is open, and thus relay 132 is de-energized. As seen in FIGS. 6 and 8, relay contacts 164 and 166 are directly connected through armature 133 when relay 132 is energized, and contacts 168 and 170 are unconnected when relay 132 is energized.

As seen in FIGS. 5 and 7, relay contacts 168 and 170 are directly connected through armature 133 when relay 132 is de-energized, and contacts 164 and 166 are unconnected when relay 132 is de-energized.

In connection with FIGS. 5 through 8, the manner of schematically representing the cooperation between cam 102 and the follower wheels 124, 125 of cam switches 108, 110 should also be noted. As explained above in connection with FIGS. 3 and 4, either one of the cam switches 108, 110, or both of them are closed when their associated follower wheels 124, 125 are in contact with the circular portion 102′ of the profile of cam 102. On the other hand, when either follower wheel 124, 125 is in contact with flat 102″ of cam 102, and not near the extreme ends of flat 102″, the associated cam switch will be open. These switch conditions are represented in FIGS. 5 through 8 by the small circles representing the follower wheels 124, 125, and their positions on the cam 102, and also by the indicated conditions (i.e., closed or open) of the corresponding switch contact sets which schematically represent the contacts of precision switches 108, 110. Thus, it may be seen in FIG. 5 that when cam 102 is in the illustrated position (i.e., so disposed that follower wheel 124 is in contact with flat cam portion 102″ and follower wheel 125 is in contact with circular cam portion 102′), precision switch 108 is open, and precision switch 110 is closed. The schematic representation of the relation of cam 102 and switches 108, 110 as shown in FIGS. 6 through 8 may be interpreted in accordance with the same conventions.

For clarity of exposition the circuit branch extending from circuit point 172 to circuit point 174 and including switch 110 will hereinafter sometimes be called branch 180. Similarly, the circuit branch extending from circuit point 172 to circuit point 174 and including switch 108 will hereinafter sometimes be called branch 182.

In accordance with well-known engineering conventions, the contacts of relay 132 which are directly connected by armature 133 when relay 132 is de-energized (i.e., contacts 168 and 170) will sometimes be called the normally closed contacts of relay 132 hereinafter; and the other contacts (164, 166) of relay 132 will similarly be called the normally open contacts of relay 132. Thus, by way of example, when it is said hereinafter that the normally open contacts of relay 132 are closed, this expression is to be understood to mean that contacts 164 and 166 are directly connected by armature 133. Similarly, the expression "normally open contacts of relay 132 are open" should be taken to denote the same condition, i.e., that contacts 164 and 166 are directly connected by armature 133, and that thus contacts 168 and 170 are open, i.e., not interconnected.

It should also be noted that the state of operation represented in FIG. 5 corresponds to that represented in FIG 3; and that the state of operation represented in FIG. 8 corresponds to that represented in FIG. 4. From these correspondences it may be seen that when the circuit of the present embodiment of my invention is in the state illustrated in FIG. 5 ramp 70 is in its rest position, and that when the circuit of the present embodiment of my invention is in the state illustrated in FIG.

8, ramp 70 is in its fully raised position (FIG. 4), and tone arm 12 is suspended above record 18, with stylus 16 located approximately above the beginning of the musical modulations of the exposed record groove, so that it will be deposited near or slightly before that point when ramp 70 returns to its rest position, after having been released by driving pin 130.

Immediate Replay Mode. As will now be shown, the immediate replay mode of operation of the device of my invention is brought about when the device is at rest (FIGS. 3 and 5) by depressing the pushbutton of switch 48 (FIG. 1) for a brief interval (i.e., at least until the turning of cam 102 in the direction indicated by arrow 184 causes follower wheel 124 to rise to circular portion 102' of cam 102, closing switch 108), and then releasing pushbutton switch 48.

The provision of a brief interval during which the pushbutton switch 48 must be continuously depressed in order to bring about the immediate replay mode of operation is a particular feature of my invention. By means of this feature of my invention the manual control pushbutton switch 48 is rendered insensitive to momentary impulses or tremors of the user's thumb, which otherwise might result in invocation of the immediate replay mode of operation when not desired.

Referring now to FIG. 5, the circuit of the present embodiment is shown in its state of rest. Since pushbutton swich 48 is in its normal "break" position, relay 132 is de-energized, and thus the normally open contacts 164, 166 are open, and circuit branch 180 is open. Due to the position of cam 102, switch 108 is open, and thus circuit branch 182 is open.

As will be evident to those having ordinary skill in the art from inspection of FIG. 5, however, the cam drive motor 94 is excited (from alternating current source 162) only when one or both of the circuit branches 180 and 182 are closed. Since neither of these circuit branches is closed in FIG. 5, it follows that in the circuit state shown in FIG. 5 motor 94 is not excited, and, further, that cam 102 is stopped in the position shown in FIG. 5.

Referring now to FIG. 6, there is shown the condition of the circuit of the present embodiment of my invention immediately after the user has depressed the pushbutton of manual control switch 48. As a result of depressing the pushbutton of switch 48 relay 132 has been energized, and the normally open contacts 164, 166 have been closed through armature 133. Since the follower wheel 125 of switch 110 is in contact with the circular portion 102' of the periphery of the cam 102, switch 110 is closed. At the time illustrated in FIG. 6, then, circuit branch 180 is closed, and, as explained above, motor 94 is excited. Since motor 94 is excited, cam 102 begins to rotate.

Referring further to FIG. 6, it will be seen that if switch 48 is released before follower wheel 124 of switch 108 rises to circular portion 102' of cam 102, i.e., before switch 108 is open, then both branches 180 and 182 will again be open, the excitation of motor 94 will cease, and the circuit arrangement of the present embodiment will again come to rest, cam 102 being slightly rotated from the position shown in FIG. 6.

If, however, switch 48 is held depressed by the user until cam 102 has rotated far enough to close switch 108, then, as best seen in FIG. 7, the releasing of switch 48 will not stop motor 94. As shown in FIG. 7 the contour of cam 102 assures that for an interval after the closing of switch 108 switch 110 will also be closed, and thus one of the circuit branches 180, 182 will be closed, and motor 94 excited, whether relay 132 is energized or de-energized. It follows that if, after switch 108 has been closed by cam 102, switch 48 is released, then branch 182 will be closed, or completed, through switch 108 and normally closed relay contacts 168, 170, and that thus motor 94 will continue to be excited, and cam 102 will continue to rotate, despite the releasing of switch 48.

As cam 102 continues to rotate beyond the position shown in FIG. 7, and, as now assumed, switch 48 remains open, and normally closed contacts 168, 170 continue closed, branch 182 will be closed, or completed, until cam 102 returns to the position shown in FIG. 5, opening branch 180 and cutting off exciting power to motor 94. It follows from the above that motor 94 will not stop until cam 102 reaches the position shown in FIG. 5 if switch 48 is held depressed until switch 108 has been closed by cam 102 and then released.

It should be observed that if switch 48 is released before switch 110 is opened by cam 102 (FIG. 8) then the opening of switch 110 by cam 102 will not stop motor 94, since branch 182 will then be closed through relay 132.

Summarizing then, if when the device of the present embodiment is in its rest position (FIG. 5) switch 48 is closed, held closed until, e.g., the arrival of cam 102 at the position shown in FIG. 7, and then released, motor 94 will continue to operate until cam 102 has completed a full cycle of rotation and returned to the position shown in FIG. 5, at which time motor 94 will stop. As was made apparent above in connection with FIGS. 3 and 4, however, ramp 70 is driven to its fully raised position and returned to its rest position, and tone arm 12 is repositioned to recommence the playing of record 18 each time motor 94, and cam 102, complete a cycle of rotation. It follows then that each time switch 48 is depressed, and then released after a brief interval at least long enough to permit cam 102 to close switch 108, the device of the present embodiment functions to lift tone arm 12 from record 18 and reposition it so as to recommence the playing of the same record. Further, since the operation of the device of the present embodiment is independent of the position of tone arm 12 in the musically modulated portion of the exposed groove of a 45 RPM record, it follows that the user can interrupt the playing of a 45 RPM record and immediately recommence the playing of the same record by depressing the pushbutton of switch 48 briefly (i.e., long enough for cam 102 to close switch 108) and then releasing it.

In a actual operative embodiment of my invention the recommencement of the playing of a record takes place approximately two seconds after the depression of switch 48, an interval which is very satisfactory for square dance calling applications.

In that same actual embodiment of my invention the interval between the initial closing of switch 48 and the closing of cam switch 108 is of such duration as to effectively avoid accidental operation of the device, but is not of so great a duration as to require the operator to consciously hold down the pushbutton 48 to assure that motor 94 will complete its full cycle. Put differently, the interval during which switch 48 must be held depressed in said actual embodiment in order to assure that motor 94 will complete its cycle is shorter than the time taken by the user to intentionally fully depress switch 48 and release it but longer than the time consumed by an accidental partial depression of the pushbutton of switch 48.

Delayed Replay Mode. In addition to the immediate replay mode just described the device of my invention offers the additional feature which is herein called the delayed replay mode of operation.

By means of the delayed replay mode of operation it is possible for the user of the device of my invention to keep tone arm 12 suspended above record 18 as shown in FIG. 4, i.e., to delay recommencement of the playing of a record 18 so long as desired.

It is a particular feature of my invention that the delayed replay mode of operation is very simply brought about by maintaining pushbutton switch 48 closed after depressing it, rather than releasing it after a brief interval as in the immediate replay mode of operation, and releasing switch 48 whenever it is desired to recommence the playing of record 18.

The operation of the device of the present embodiment of my invention to accomplish the delayed replay mode of operation will now be described in connection with FIGS. 5 through 8.

Assuming that the device of my invention is at rest (FIG. 5), and that switch 48 has been depressed (FIG. 6), and is held depressed, the operating cycle of the device of my invention will proceed to the state shown in FIG. 7 as explained above. As further explained above in connection with FIG. 7, motor 94 will continue to operate whether switch 48 is open or closed, i.e., whether relay 132 is energized or de-energized.

Referring now to FIG. 8, it is shown that in the delayed replay mode, i.e., when switch 48 is held depressed and thus relay 132 remains energized, the alternating current power supplied to motor 94 is interrupted, and motor 94 is stopped, when switch 110 is opened by cam 102. The stopping of motor 94 results from the fact that both of the circuit branches 180 and 182 are open. As shown in FIG. 8, the normally closed contacts 168, 170 are open because switch 48 is depressed and thus relay 132 energized. Thus, the only path through which motor 94 can be excited includes branch 180. When cam 102 opens switch 110, however, branch 180 is opened and thus motor 94 is stopped at the cam position shown in FIG. 8. As pointed out above, ramp 70 is fully raised and tone arm 12 is suspended above record 18 when cam 102 is in the position shown in FIG. 8. It follows that by keeping switch 48 open (i.e., keeping the pushbutton of that switch depressed) the user can indefinitely maintain tone arm 12 suspended above the beginning of the musical modulations of the exposed groove of record 18.

Referring again to FIG. 8 it will be seen that when switch 48 is released and relay 132 de-energized normally closed contacts 168, 170 will be closed through armature 133, and since switch 108 is closed branch 182 will then be completed and motor 94 restarted. If switch 48 then remains open, and consequently normally closed contacts 168, 170 remain closed, branch 182 will remain closed until, as explained above, switch 108 is opened by cam 102 at the time when the device of my invention has returned to its rest position (FIG. 5). As pointed out above, however, ramp 70 returns to its rest position (FIG. 3) as cam 102 returns to the position shown in FIG. 5, and tone arm 12 is deposited on record 18 at the beginning of the musically modulated portion of the exposed record groove, thus recommencing the playing of record 18.

Thus, it will be seen that after tone arm 12 has been suspended above record 18 (FIG. 8) by keeping switch 48 depressed, the user need merely release switch 48 at any desired time to cause the device of my invention to complete its cycle of operation and return to its state of rest. During the cycle completion interval stylus 16 of tone arm 12 is deposited on revolving record 18 at the beginning of the musically modulated portion of the exposed groove and the playing of record 18 is recommenced.

It will thus be seen that the objects set forth above, among those made apparent from the preceding description, are efficiently attained, and, since certain changes may be made in the above constructions without departing from the scope of my invention, it is intended that all matter contained in the above description or shown in the accompanying drawings shall be interpreted as illustrative only, and not in a limiting sense.

It is also to be understood that the following claims are intended to cover all of the generic and specific features of my invention herein described, and all statements of the scope of my invention which might, as a matter of language, be said to fall therebetween.

Having described my invention, what I claim as new and desire to secure by Letters Patent is:

1. A combined phonograph and public address system including a turntable, a tone arm having a stylus, and a microphone interconnected with the public address system by a flexible cable, wherein the improvement comprises:

a tiltable arm pivotably mounted to said phonograph and underlying said tone arm and carrying a stop, said tiltable arm and said stop being so positioned with respect to said tone arm and said turntable that when said tiltable arm is tilted from an inactive position to an active position during the playing of a phonograph record on said turntable by means of said stylus and tone arm said stylus is raised by said tiltable arm from the groove of said phonograph record and slides down said tiltable arm to contact said stop, and when said tiltable arm returns to said inactive position it lowers said tone arm and thus deposits said stylus in said groove near the beginning of the modulated portion thereof, the entire path followed by the stylus while the tone arm is in contact with said tiltable arm overlying said record;

tilting means for tilting said tiltable arm from said inactive position to said active position and back to said inactive position when rotated;

electric motor means for rotating said tilting means;

switch operating means driven by said electric motor means;

power supply means for supplying power to said electric motor means;

first and second branch circuits each connected in series with said electric motor means and said power supply means;

a first switch in said first branch circuit operated by said switch operating means;

a second switch in said second branch circuit operated by said switch operating means;

relay means alternatively closing said first branch circuit when energized and closing said second branch circuit when de-energized; and manually operable remote control switch means located at said microphone for energizing and de-energizing said relay means.

* * * * *